United States Patent Office 3,730,951
Patented May 1, 1973

3,730,951
POLYENES MODIFIED WITH POLYFUNCTIONAL
N-HALO AMINES
George L. Braude, Ellicott City, Md., assignor to
W. R. Grace & Co., New York, N.Y.
No Drawing. Filed Dec. 22, 1971, Ser. No. 211,094
Int. Cl. C08g 22/04
U.S. Cl. 260—77.5 B      26 Claims

ABSTRACT OF THE DISCLOSURE

Modified polymers are prepared by reacting liquid or solid polyenes containing at least two reactive carbon to carbon unsaturated groups per molecule with polyfunctional N-halo amines, particualrly N-halo polycarbamates under ambient conditions in the presence of free radical generators such as UV irradiation. The resulting modified polymers range from solvent soluble chain extended polymers to solid cured, i.e. cross-linked stable and solvent resistant polymeric materials. The modified polymers may be used as coatings, films, sealants, molded products, wet strength resins, textile treating agents, bleaching agents, flame retardants and the like.

BACKGROUND OF THE INVENTION

This invention relates to polyfunctional N-halo amines and modifying polymers with said compounds. More particularly, this invention relates to modifying polyenes containing at least two reactive carbon to carbon unsaturated groups per molecule with polyfunctional N-halo amines preferably with N-halo polycarbamates and particularly with N-chloro polycarbamates to yield modified polymers having β-halo amine linkages

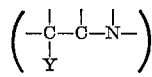

wherein Y is a halogen.

Prior art methods mainly utilize sulfur or sulfur containing compounds such as polythiols to effect the crosslinking of unsaturated polymers such as polybutadiene or polyisoprene to solid cured products. These mercapto cured systems usually possess certain disadvantages, particularly the mercapto containing compounds yield cured elastomeric compositions with offensive sulfur odors. Generally certain end uses, e.g. coatings or sealants for packaging applications, particularly for the food industry, require sulfur-free curable materials.

In accordance with this invention, it has been found that various liquid and solid unsaturated polymers can be effectively cured with polyfunctional N-halo amines to odorless solid, elastomeric or resinous polymeric products which are stable, tough and solvent resistant materials. In addition, it has been found that the polyfunctional N-halo amines are not only effective crosslinking agents, but also are useful in modifying unsaturated polymers to improve their properties and in preparation of both liquid and solid solvent soluble polymers containing nitrogen and halogen atoms. These modified polymers possess desirable features such as affinity for negatively charged surfaces, oxidation-reduction potential, UV absorptivity, potential reactivity of halogen atom, e.g. chlorine, in beta position to nitrogen, etc.

As a result of this invention the above mentioned cured products, as well as uncured polymers, can be prepared by admixing the polyfunctional N-halo amines containing two or more N-halo amine groups per molecule with polyenes containing two or more reactive carbon to carbon unsaturated groups per molecule at ambient conditions to yield modified polymers having β-halo amine linkages. As used herein the term β-halo linkage means a linkage wherein the halogen atom is substituted on the beta (β), i.e. second carbon atom from the nitrogen atom of the halo amine molecule. This addition reaction is often spontaneous, but can be initiated in the presence of free radical generating conditions such as irradiation with radiant energy, e.g. UV light.

As used herein, the term polyvalent means having a valance of two or greater and the term polyfunctional N-halo amines refers to simple or complex organic compounds having a multiplicity, i.e. at least 2 of pendant or terminally positioned N-halo amine ($-NR'_{2-n}Y_n$) functional groups per average molecule. In the above formula, R' is hydrogen or a monovalent organic radical, Y is a halogen and n is or 2.

The polyfunctional N-halo amines operable in the instant invention can be exemplified by the general formula: $R^2-(NR'_{2-n}Y_n)_m$ wherein m is at least 2, n is 1 or 2; R' is preferably hydrogen, but maybe a monovalent organic radical such as hydrocarbyl radical, i.e. alkyl, aryl, alkaryl, etc.; Y is a halogen such as chlorine, bromine, fluorine, iodine, preferably chlorine, and $R^2$ is a polyvalent organic radical member free from reactive carbon to carbon unsaturation. Thus $R^2$ may contain cyclics groupings and minor amounts of hetero atoms such as N, S, P or O but primarily contains carbon-carbon, carbon-hydrogen, carbon-oxygen, or silicon-oxygen, silicon-carbon containing chain linkages free of any "reactive" carbon to carbon unsaturation.

The operable polyfunctional N-halo amines usually have molecular weights in the range of 129 to 30,000 preferably 286 to 20,000.

Operable polyfunctional N-halo amines, include, but are not limited to, those N-halo amines based on aliphatic or aromatic polyamines, e.g. based on ethylene diamine or polyamines including homologs, e.g. N,N'-dichloro ethylene diamine; or those N-halo amines based on ureas or substituted ureas (i.e. amine nitrogen is linked to carbonyl groups) which yield products such as N,N'-dichlorourea (ClNHCONHCl) or its tetrachloro substituted derivative; N-halo amines based on carbamates, i.e. (amine nitrogen is directly linked to the carbon of a carboxylate), products such as ethylene bis (N,N-dichloro-O-carbamate) and the like.

These polyfunctional N-halo amines can be readily prepared by halogenation of the corresponding amines, e.g., chlorination with chlorine or hypochlorite.

The preferred class of polyfunctional N-halo amines operable in the instant invention are N-halo polycarbamates. Thus, the invention will be defined in terms of N-halo polycarbamates, although other polyfunctional amines are operable as well.

These N-halo polycarbamates have the general formula:

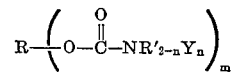

wherein m is at least 2 and n is an integer from 1 to 2; Y is a halogen, such as chlorine, bromine, fluorine, iodine, preferably chlorine; R is a polyvalent organic radical member free from reactive carbon to carbon unsaturation.

Operable, non-limiting R members include polyvalent radical members such as aryl, substituted aryl, aralkyl, substituted aralkyl, cycloalkyl, substituted cycloalkyl and alkyl and substituted alkyl groups containing 1 to 36 carbon atoms, said group members can be internally connected to one another by a divalent chemically compatible linkage selected from the group consisting of oxide, carboxylate, carbonate, urethane and substituted urethane, urea and substituted urea, amide and substituted amide, amine and substituted amine, sulfide, sulfone and hydrocarbon.

Said hydrocarbon linkages may be represented by the formula

wherein $n$ is at least 1 and $R^3$ is independently selected from the group consisting of hydrogen, halogen, aryl, substituted aryl, alkaryl, substituted alkaryl, cycloalkyl, substituted cycloalkyl and alkyl having 1 to 16 carbons atoms.

Preferred examples of operable aryl members are either phenyl or naphthyl, and of operable cycloalkyl members which have 3 to 8 carbon atoms. Likewise, preferred substituents on the substituted members may be such groups as nitro, chloro, bromo, fluoro, acetoxy, acetamido, phenyl, benzyl, alkyl and alkoxy of 1 to 9 carbon atoms, and cycloalkyl of 3 to 8 carbon atoms.

The N-halogenated polycarbamates of this invention are considered N-substituted N-halo carbamates when R' in the above formula is a hydrocarbyl radical, i.e. alkyl, aryl, alkaryl, etc. The N-halo polycarbamates are considered unsubstituted when R' is hydrogen. These unsubstituted N-halo polycarbamates are preferred, particularly when the halogen Y is chlorine and $n$ is 2.

Thus, for purpose of explanation, the N-halogenated polycarbamates will be illustrated in terms of unsubstituted polyfunctional N-chloro and N,N-dichlorocarbamates. Thus, in case of N-chlorocarbamates R' is H and $n$ is 1.

The unsubstituted N-chlorinated polycarbamates may be prepared by chlorination of the corresponding polycarbamates having the general formula

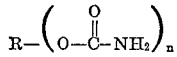

wherein R and $n$ are as above defined, R being the residue of a polyhydric alcohol. The latter precursor compounds may be formed according to well-known methods such as phosgenation of the polyhydric alcohol followed by treatment with ammonia. For example, the simplest N-chlorinated carbamate, ethylene bis (N,N-dichloro-O-carbamate) can be readily prepared by phosgenating ethylene glycol to form ethylene glycol bis (chloroformate) which is subsequently converted to the ethylene bis (O-carbamate) by reaction with ammonia. The thus formed carbamate is thereafter chlorinated to yield the desired ethylene bis (N,N-dichloro-O-carbamate).

The reaction of phosgene with polyhydric alcohols is well known and can be carried out at about $-40°$ C. to $+45°$ C. in the presence of a t-amine catalyst such as pyridine, dimethylaniline, quinoline and the like. Inert organic solvents such as benzene, toluene, ethers and the like may be used. Usually a slight excess over the stoichiometric amount of the phosgene is employed.

Ammoniation of the chloroformates can be conducted at about $-5°$ C. to $50°$ C., or sometimes slightly higher temperatures. Essentially, stoichiometric amounts of the reactants are utilized although a slight excess of ammonia, from about 5- to 20-mole percent excess is advantageous. Ammonia is usually added as an aqueous solution of ammonium hydroxide, containing from about 2 to 40 percent ammonia by weight. N-substituted carbamates result when primarily amines are employed in the reaction instead of ammonia. The reaction may be carried out in the presence of the aforementioned inert organic solvents useful in the phosgenation step. The ammonium chloride byproduct of this reaction should be completely removed prior to the chlorination of the carbamate. Removal of ammonium chloride can be accomplished by repeated water washings or recrystallization of the carbamate from a hot aqueous solution. Other known methods of preparing carbamates may be used such as reaction of a polyhydric alcohol with a stoichiometric amount of methyl or ethyl carbamate.

Chlorination of the carbamate can be accomplished in an aqueous media using a suitable chlorinating agent such as gaseous chlorine, t-butylhypochlorite, hypochlorous acid and salts thereof, e.g., sodium hypochlorite at about $0°$ C. to $50°$ C. The chlorination reaction, particularly with chlorine gas, may be carried out in mixtures of water and inert organic solvents such as chloroform, carbon tetrachloride, tetrachlorethane, methylene chloride, chlorinated paraffins, benzene and the like.

Generally, stoichiometric amounts of the chlorinating agent and carbamate are used to obtain the desired mono or dichlorocarbamate products. Thus, if ethylene bis (N,N-monochloro-O-carbamate) is desired, two moles of chlorine gas are required for every mole of ethylene bis (O-carbamate). For complete chlorination to the dichlorocarbamates, it is desirable to use an excess of the chlorinating agent, from about 2 to 20 mole percent. Actually, by adjusting the ratio of the carbamate and chlorination agent reactants N-chlorinated polycarbamate compositions can be obtained having varied chlorine content, since in any given polycarbamate molecule having $x$ number of reactive hydrogen atoms linked to the carbamate nitrogen, from 1 to $x$ including fractional values of said hydrogen atoms can be replaced by chlorine atoms.

As mentioned above, N-substituted N-halo polycarbamates can be prepared according to the sequence of steps outlined above, except that in the formation of the polycarbamate, the ammonia in the reaction is substituted by suitable aliphatic or aromatic primary amines. An alternate route is the formation of the N-substituted polycarbamate, i.e. polyurethane intermediate by well-known method of preparing polyurethanes via the reaction of an aliphatic or aromatic isocycanate with a polyol. The thus formed polyurethane can be chlorinated to the desired N-halopolycarbamate according to the chlorination procedures outlined above.

The polyhydric alcohols which are suitable in the preparation of the subject N-halo polycarbamates of the above defined formula

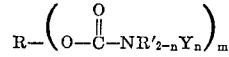

are polyhydroxy compounds having a general formula $R(OH)_m$ wherein R is a polyvalent organic radical member free from reactive carbon to carbon unsaturation, $m$ is 2 or greater, preferably 4 or greater. These polyhydroxy compounds include glycols, triols, tetraols, pentaols, hexaols and the like. Non-limiting examples of operable polyhydric alcohols include glycerol, trimethylolpropane, pentaerythritol, di- or tri-pentaerythritols etc. Other suitable polyhydroxy compounds are sugar alcohols which generally have the formula $HOCH_2(CHOH)_nCH_2OH$ where $n$ has a value from 2 to 6. Particularly suitable are the commercially available hexitols, mannitol and sorbitol.

It is to be noted that polyhydroxy compounds in which the R radical number includes linkages containing hetero atoms such as N, O, P, S, Si are operable as well. Representative examples include, but are not limited to polyols such as di or triethanol amine, diphenyl silane diol, hydroxy ethyl sulfide, i.e. thioglycol, various dihydroxy terminated carbamyl thioethers, e.g., N,N'-bis-(2-hydroxyethyl-β-thiopropionyl)-urea having the formula:

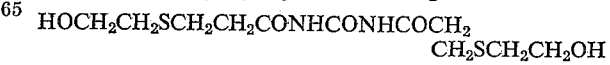

as disclosed in U.S. Pat. No. 3,574,709 said pertinent portions relating to the compounds and preparation thereof, in said patent being incorporated herein by reference.

Particularly suitable polyhydroxy compounds are polymeric polyols containing poly (alkylene oxide) groups such as polyethylene glycols, polypropylene glycols, polybutylene glycols or mixed poly (alkylene oxide) glycols. Polyhydric alcohols formed by addition of an alkylene oxide to a triol or higher polyol are operable as well. Specific examples of preferred polyols are ethoxylated pentaerythritol and poly (alkylene oxide) hexols (e.g., NIAX Polyol LS-490; Union Carbide).

Preferably, the molecular weight of these polymeric polyols is within the range of 300 to 25,000 especially within the range of 400 to 6000.

The poly(alkylene oxide) groups illustrate the R radical group members which are internally connected to one another by an oxide, i.e., —O— linkage which may be represented by repeating units —$(C_2H_4O)_f$—, —$(C_3H_6O)_g$—, —$(C_4H_8O—)_h$ wherein $f$, $g$ and $h$ are integers of at least 1, $f$ is preferably 8 or greater.

The N-halo polycarbamates particularly N-chloro polycarbamates formed from polyols having poly(ethylene oxide) units, i.e. $(C_2H_4O)_f$— wherein $f$ is about 10 or greater are generally somewhat water soluble. The latter N-chloro polycarbamates are particularly suitable bleaching or disinfecting agents. To be effective, the latter agents should be at least slightly water soluble. Suitable water soluble N-chloro polycarbamates can be formed from polyethylene glycols having molecular weights from about 400 to 6000. It is to be noted that polyols containing mixtures of other poly (alkylene oxide) units with the aforementioned poly (ethylene oxide) units are generally water soluble.

Other operable polymeric polyols include, but are not limited to poly(alkylene ester) diols (e.g., RC polyester R–101–70, Hooker Chemical Corporation), silicone diols (e.g., SR–174, General Electric Company), phosphorous based polyols (e.g., Pluracol 208, Wyandotte Chemical Corporation) and the like.

The N-halo polycarbamates of the subject invention in the presence of free radical conditions undergo an addition reaction with the reactive unsaturated carbon to carbon groups of various polyenes to yield modified polymers having the following β-halo carbamate linkages

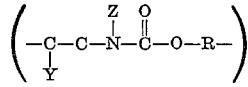

As used herein, the term β-halo carbamate linkage means a linkage wherein the halogen atom is susbstituted on the beta, i.e., second carbon atom from the nitrogen atom of the carbamate group, and Z is either Y or hydrogen atom. The subject addition reaction is preferably carried out with N-halo polycarbamates of the previously defined formula

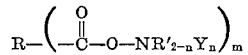

wherein R' is hydrogen, Y is chlorine and particularly when $n$ is 2. In this case, the addition products, i.e., modified polymers possess β-chlorocarbamate linkages, and particularly β-chloro-N-chloro carbamate linkages.

As used therein polyenes and polyynes refer to a simple or complex species of alkenes or alkynes having a multiplicity, i.e., at least 2 "reactive" carbon to carbon unsaturated functional groups per average molecule. For example, a diene is a polyene that has two "reactive" carbon to carbon double bonds per average molecule, while a diyne is a polyyne that contains in its structure two "reative" carbon to carbon triple bonds per average molecule. Combinations of "reactive" triple bonds within the same molecule are also operable. An example of this is monovinylacetylene, which is a polyeneyne under our definition. For purposes of brevity, all these classes of compounds will be referred to herein as polyenes.

The term "functionality" as used herein refers to the average number of ene or N-halo carbamate groups per molecule in the polyene or N-halo polycarbamate respectively. For example, a triene is a polyene with an average of three "reactive" carbon to carbon unsaturated groups per molecule and thus has a functionality (f) of three. A N-halo dicarbamate is a N-halo polycarbamate with an average of two N-halo carbamate groups per molecule and thus has a functionality (f) of two.

It is further understood and implied in the above definitions that in those systems, the functionality of the polyene and the N-halo polycarbamate component is commonly expressed in whole numbers although in practice the actual functionality may be fractional. For example, a polyene component having a nominal functionality of 2 (from theoretical consideration alone) may in fact have an effective functionality of somewhat less than 2. In an attempted synthesis of a diene from a glycol in which the reaction proceeds to 100% of the theoretical value for complete reaction, the functionality (assuming 100% pure starting materials) would be 2.0. If, however, the reaction were carried out to only 90% of theory for complete reaction, about 10% of the molecules present would have only one ene functional group, and there may be a trace of material that would have no ene functional groups at all. Approximately 90% of the molecules, however, would have the desired diene structure and the product as a whole then would have an actual functionality of 1.9. Such a product is useful in the instant invention and is referred to herein as having a functionality of 2.

As used herein the term "reactive" unsaturated carbon to carbon groups means groups which will react under proper conditions as set forth herein with N-halo carbamate groups to yield the β-halo-carbamate linkage

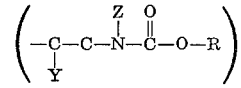

as contrasted to the term "unreactive" carbon to carbon unsaturation which means —C=C groups when found in aromatic nucleii (cyclic structures exemplified by benzene, pyridine, anthracene, and the like) which do not under the same conditions react with N-halo carbamates to give β-halo carbamate linkages.

The term "modified polymers" as used herein means the addition products formed by reaction of polyenes with N-halo polycarbamates containing two or more N-halo carbamate groups per average molecule, said addition products containing at least three and preferably greater than three β-halo carbamate linkages per average molecule. Thus, "modified polymers" include addition products such as chain extended polymers, which can be considered as prepolymers, e.g., linear polymers, as well as cured or crosslinked polymers. The chain extended modified polymer products may contain free reactive carbon to carbon unsaturated functional groups and/or free N-halo carbamate functional groups within the molecule. Due to the presence of said free functional groups in the modified polymers, these addition products are highly reactive intermediates in the preparation of still other polymeric materials. Said modified polymers can be further treated with various suitable reactive curing compounds to yield solid cross-linked products.

The modified polymers of this invention which are chain extended polymers may have average molecular weights ranging from 200 to 250,000 preferably from 500 to 25,000 and range from liquid to solid materials which are solvent soluble including water soluble.

Other suitable modified polymers of the subject invention are high molecular weight solid elastomeric or resinous products. The latter modified polymers which possess a dense, cross-linked network of molecules having β-halo carbamate linkages and are generally odorless, tough and solvent resistant materials.

One group of polyenes operable in the instant invention to react with N-halo polycarbamates is that taught in now abandoned application having Ser. No. 617,801 filed Feb. 23, 1967, assigned to the same assignee and incorporated herein by reference. This group includes those polyenes having a molecular weight in the range 64 to 20,000 of the general formula [A]—(X)$_y$ wherein $x$ is a member of the group consisting of

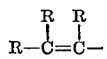

and R—C≡C—; $y$ is at least 2, R is independently selected from the group consisting of hydrogen, halogen, furyl, thienyl, pyridyl, aryl, substituted aryl, cycloalkyl, substituted alkyl groups containing 1 to 16 carbon atoms and A is a polyvalent organic moiety free of (1) reactive carbon to carbon unsaturation and (2) unsaturated groups in conjugation with the reactive ene or yne groups in X. Thus, A may contain cyclic groupings and minor amounts of hetero atoms such as N, S, P or O but contains primarily carbon-carbon, carbon-oxygen or silicon-oxygen, silicon-carbon, chain linkages without any reactive carbon to carbon unsaturation. More particularly, A is a polyvalent radical member selected from the group consisting of aryl, substituted aryl, aralkyl, substituted aralkyl, cycloalkyl, substituted cycloalkyl and alkyl and substituted alkyl groups containing 1 to 36 carbon atoms, said group members can be internally connected to one another by a divalent chemically compatible linkage selected from the group consisting of oxide, carboxylate, carbonate, carbonyl, urethane and substituted urethane, urea and substituted urea, amide and substituted amide, amine and substituted amine, sulfide, sulfone, phosphonate, phosphite, phosphate, silane, substituted silane and hydrocarbon, said A member being connected to the X member by a divalent chemically compatible connecting linkage selected from the group consisting of oxide, sulfide, carboxylate, carbonate, urethane and substituted urethane, urea and substituted amide, amine and substituted amine, silane, substituted silane and hydrocarbon. Said hydrocarbon linkages may be represented by the formula

wherein $n$ is at least 1 and R is independently consisting of hydrogen, halogen, aryl, substituted aryl, alkaryl, substituted alkaryl, cycloalkyl, substituted cycloalkyl and alkyl having 1 to 16 carbon atoms.

Preferred example of operable aryl members are either phenyl or naphthyl, and of operable cycloalkyl members which have from 3 to 8 carbon atoms. Likewise, preferred substituents on the substituted members may be such groups as nitro, chloro, bromo, fluoro, acetoxy, acetamido, phenyl, benzyl, alkyl and alkoxy of 1 to 9 carbon atoms, and cycloalkyl of 3 to 8 carbon atoms.

As used herein for determining the position of the reactive functional carbon to carbon unsaturation, the term "Terminal" means that said functional unsaturation is at an end of the main chain in the molecule; whereas by "near terminal" is meant that the functional unsaturation is not more than 16 carbon atoms away from an end of the main chain in the molecule. The term "pendant" means that the reactive carbon to carbon unsaturation is located terminally or near terminally in a branch of the main chain as contrasted to a position at or near the ends of the main chain. For purposes of brevity, all of these positions will be referred to generally as "terminal" unsaturation.

The polyenes operable in the first group of polyenes described above in the instant invention contain one or more of the following types of non-aromatic and non-conjugated "reactive" carbon to carbon unsaturation:

(1) —CH=CH—  (5) —C=C—
(2) —C≡C—      (6) —C=CH—
(3) —CH=CH$_2$  (7) —CH=C—
(4) —C≡CH      (8) —C=CH$_2$

These functional groups as shown in 1–8 supra are situated in a position either which is pendant, terminal or near terminal with respect to the main chain but are free of terminal conjugation. As used herein the phrase "free of terminal conjugation" means that the terminal "reactive" unsaturated groupings may not be linked directly to non-reactive unsaturated species such as:

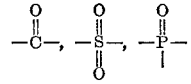

and the like so as to form a conjugated system of unsaturated bonds exemplified by the following structure:

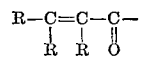

etc.

Examples of operable polyenes from this first group include, but are not limited to:

(1) Crotyl-terminated polyurethanes which contain two "reactive" double bonds per average molecule in a near terminal position of the average general formula:

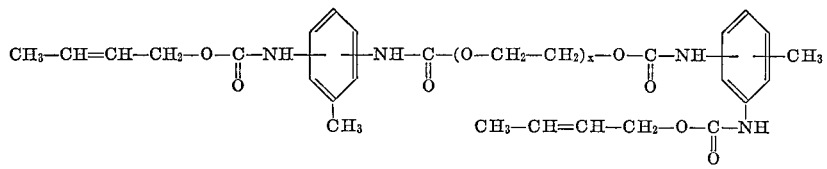

wherein $x$ is at least 1, (2) The following structure which contains terminal "reactive" double bonds:

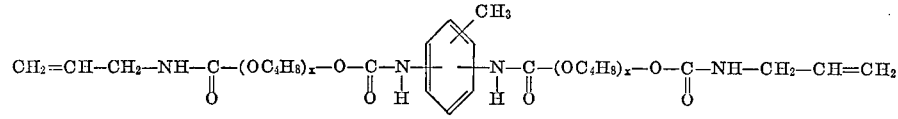

where $x$ is at least 1, (3) The following structure which contains terminal "reactive" double bonds:

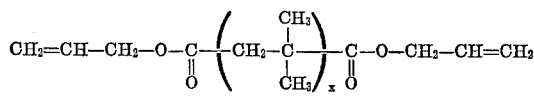

where $x$ is at least 1, and (4) The following structure which contains near terminal "reactive" double bonds:

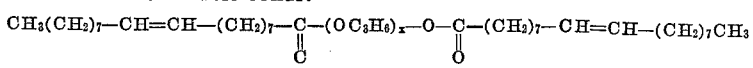

where $x$ is at least 1.

(5) Ethylene/propylene/non-conjugated diene terpolymers, such as "Nordel 1040" manufactured by duPont which contains pendant "reactive" bonds of the formula: —CH$_2$—CH=CH—CH$_3$.

Also included within this first group of polyenes are non-limiting examples of monomers such as triallyl isocyanurate, diallyl phthalate, bis(diallylamino)methane, trimethylol propane triallyl ether, triallylurea, vinyl cyclohexene, divinyl benzene and the like.

A second group of polyenes operable in this invention includes those polyenes in which the reactive unsaturated carbon to carbon bonds are conjugated with adjacent unsaturated groupings.

Examples of operable reactive conjugated ene systems include, but are not limited to, the following:

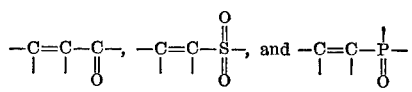

A few typical examples of polymeric polyenes which contain conjugated reactive double bond groups such as those described above are polyethyleneether glycol diacrylate having a molecular weight of abou 750, polytetramethyleneether glycol dimethacrylate having a molecular weight of about 1175, the triacrylate of the reaction product of trimethylolpropane with 20 moles of ethylene oxide, or other ethylenically unsaturated esters of aliphatic polyhydric alcohols with acrylic acid, methacrylic acid, itaconic acid and the like as well as mixtures thereof. Non-limiting examples include esters of pentaerythritol, dipentaerythritol, polypentaerythritols such as pentaerythritol tetraacrylate, dipentaerythritol pentaitaconate, tripentaerythritol octoacrylate and the like. Mixtures of dimers, trimers, as well as higher polymers of these unsaturated esters are operable as well. The aforementioned esters may be prepared by methods well known in the art.

A third group of polyenes operable in the instant invention includes unsaturated polymers in which the double or triple bonds occur primarily within the main chain of the molecules.

Non-limiting examples include conventional liquid or elastomeric polyunsaturated polymers (derived primarily from standard diene monomers) such as polybutadiene, polyisoprene, or polymers preferred from piperylene, 2-methyl-1,3-pentadiene and the like; natural rubber, styrene-butadiene rubber, isobutyleneisoprene rubber, polychloroprene, styrene-butadiene-acrylonitrile copolymers and the like; unsaturated polyesters, polyamides, and polyurethanes derived from monomers containing "reactive" unsaturation, e.g., adipic acid-butenediol, 1,6-hexanediaminefumaric acid and 2,4-tolylene diisocyanate-butenediol condensation polymer and the like.

Another group of operable polyenes having an -ene or -yne functionality of at least two are formed by reacting either (a) an organic epoxide containing at least two

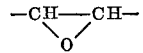

groups in its structure with a member of the group consisting of hydrazine, primary amines, secondary amines, tertiary amine salts, organic alcohols and organic acids wherein said group members contain at least one organic substituent containing a reactive ethylenically or ethynylically unsaturated group, or (b) an organic epoxide containing at least one organic substituent containing a reactive ethylenically or ethynylically unsaturated group with a member of the group consisting of hydrazine and an organic material containing at least two active hydrogen functions from the group consisting of

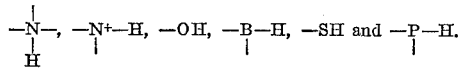

It is to be noted that various other polymerizable polyenes well known in the art as having at least two reactive carbon to carbon unsaturated groups per molecule are operable as well. Likewise, in practicing the instant invention, it should be understood that various combinations of polyenes as well as polyfunctional N-halo amines disclosed herein are operable.

The modification of the polyenes i.e., the addition reaction of the N-halo polycarbamates to the polyenes can be initiated under free radical generating conditions. Thus, radiation such as actinic radiation, e.g., ultraviolet light; ionizing radiation such as high energy ionizing radiation, for example gamma radiation, electron beams, X-rays and the like, or ionizing radiation of lower energy such as corona discharge or glow discharge; as well as chemical free radical generating compounds such as numerous azo or peroxidic compounds (with or without accelerators) may be applied to the reactants to promote the addition reaction. These latter compounds are capable of thermal dissociation, usually between room temperature and about 150° C. to yield free radicals. Useful non-limiting free radical precursors include benzoyl peroxide, cyclohexanone peroxide with dimethyl aniline or cobalt napthenate as an accelerator; hydroperoxides such as cumene hydroperoxide, t-butyl hydroperoxides peracid compounds such as t-butylperbenzoate, peracetic acid; persulfate such as ammonium persulfate; azo compounds such as azobis-isobutyronitrile and the like.

The addition reaction may likewise be initiated by merely exposing the polyene and N-halo polycarbamate admixture to ambient conditions (oxygen from the air being the initiator) to obtain a modified polyene having $\beta$-halo carbamate linkages. Thus, it was found that when pentaerythritol tetra (N,N-dichlorocarbamate) dissolved in benzene was added to an epoxy tetraene (a polyene formed via the addition of 2 moles of diallyl amine to 1 mole of diglycidyl ether of Bisphenol A commercially available under the trade name "Epon 828") at ambient conditions, a solid modified polyene product was formed upon curing.

The conditions at which the addition reaction is conducted can vary over a wide range. Operable reaction temperatures range from —50° C. to 180° C. Preferably, the modification reaction proceeds at ambient temperatures, e.g., from about 20 to 80° C. Generally, the polymerization or curing reaction can be accelerated by increasing the temperature of the composition at the time of initiation. However, the reaction can be successfully conducted at temperatures considerably below room temperature, particularly when actinic radiation is employed as a free radical initiator. In cases where the modification reaction is highly exothermic after initiation, it may be effectively controlled by cooling to lower temperatures, such as —20° to 10° C. A suitable means of controlling the reaction exotherm can be achieved by utilizing inert diluents which generally are organic solvents unreactive and inert to the subject reactants under free radical conditions. Suitable solvents include, but are not limited to, benzene, chloro or bromo benzene, chlorinated paraffins, carbon tetrachloride, chloroform, tetrachlorethane, methylene chloride and the like.

The subject modification reaction of polyenes with N-halo polycarbamates can be carried out in bulk, in inert organic solvents or as dispersions or emulsions in aqueous media.

The preferred free radical initiator is actinic radiation suitably in the wavelength range of 2000 to 6500 A. A suitable actinic light is ultraviolet light and other forms of actinic radiation which are normally found in radiation emitted from the sun or from artificial means such as Type RS sunlamps, carbon arc lamps, xenon arc lamps, mercury vapor lamps, black light UV lamps, and the like. If desired, suitable photosensitizers may be used with ultraviolet radiation. As used herein a photosensitizer means either a photoinitiator as employed in a polymerization reaction or a curing rate accelerator as used in a curing reaction or both. Curing periods may be adjusted to be very short and hence commercially economical by proper choice of ultraviolet source, photocuring rate accelerator and concentration thereof, temperature, and molecular weight and reactive groups functionality of the polyene and N-halo polycarbamate.

Various photosensitizers are operable and well known to those skilled in the art. Examples of photosensitizers include, but are not limited to, benzophenone, acetophenone, acenapthene-quinone, methyl ethyl ketone, valerophenone, hexanophenone, γ-phenylbutyl-butyrophenone, p-morpholinopropiophenone, dibenzosuberone, 4-morpholinobenzophenone, 4′-morpholinodeoxybenzoin, p-diacetylbenzene, 4 - aminobenzophenone, 4′-methoxyacetophenone, benzaldehyde, α-tetralone, 9-acetylphenanthrene, 2- acetylphenanthrene, 10-thioxanthenone, 3 - acetylphenanthrene, 3-acetylindole, 9-fluorenone, 1-indianone, 1,3,5-triacetylbenzene, thioxanthen-9-one, xanthene-9-one, 7-H-benz[de]anthracen-7-one, 1-naphthaldehyde, 4,4′-bis(dimethylamino benzophenone, fluorene-9-one, 1′-acetonaphthone, 2′-acetonaphthone and 2,3-butanedione, etc. which serve to give greatly reduced exposure times.

The photosensitizers, i.e., curing rate accelerators or photoinitiators are usually added in an amount ranging from 0.0005 to 50% by weight, preferably 0.05 to 10%, of the photocurable or photopolymerizable composition of the instant invention.

Conventional curing inhibitors or retarders which may be used in order to stabilize the components or curable compositions so as to prevent premature onset of polymerization or curing include, but are not limited to, hydroquinone; p-tert-butyl catechol; 2,6-ditert-butyl-p-methyl-phenol; phenothiazine; N-phenyl-2-naphthylamine, phosphorous acid, phosphorous acid/octadecanol and dilauryl phosphite; inert gas atmospheres such as helium, argon, nitrogen, and carbon dioxide; vacuum; and the like.

Whenever it is desired to convert the polyene/N-halo polycarbamate composition to a cured solid state, the curing period may be varied greatly by proper choice of type and concentration of photocuring rate accelerators. In combination with suitable accelerators or retarders, the curing period may vary from about a second or less to about 30 days or more. In general, short curing periods are achieved in applications where thin films of curable composition are required, such as in the field of coatings, whereas the long curing periods are achieved and desired where more massive layers of composition are required, such as in the field of elastomeric sealants.

The reaction of polyenes with N-halo polycarbamates of the subject under free radical conditions yields a wide variety of modified polymers. Chain extended solvent soluble polymers, e.g. long chain linear polycarbamate polymers can be obtained reacting difunctional polyenes and N-halo polycarbamates, i.e. total combined functionality of said reactants is 4. Such polymers may be obtained when the mole ratio of the N-halopolycarbamate to polyene varies from 0.5 to 2.0.

A non-limiting example of the reaction and linear polymers contemplated by the process of this invention may be schematically illustrated by the following Equation I:

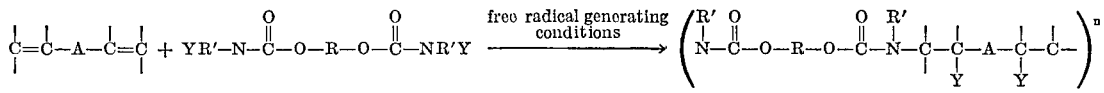

The value of $n$ may vary over a wide range. Generally, $n$ ranges between 2 and 5000, preferably between 5 and 50. In the above Formulas A and R are divalent organic radical members free from reactive carbon to carbon unsaturaturation, R′ is either hydrogen or halogen, preferably chlorine. For example, a benzene soluble chain extended polymer wherein $n=10$ was obtained by reacting equimolar amounts of ethylene bis (N,N-dichlorocarbamate) with 1,6-hexadiene.

To obtain the maximum strength, solvent resistance, creep resistance, heat resistance and freedom from tackiness, the reaction components consisting of the polyenes and N-halo polycarbamates of this invention are formulated in such a manner as to give solid, crosslinked, three dimensional network β-halo carbamate linkage containing polymer systems on curing. In order to achieve such infinite network formation, the individual polyenes and N-halo polycarbamates must have a functionality of at least 2 and the sum of the functionalities of the polyene and N-halo polycarbamates components must always be greater than 4. Blends and mixtures of the polyenes and the N-halo polycarbamates containing said functionality are also operable herein.

In general, it is preferred, especially at or near the operable lower limits of functionality in the polyene and N-halo polycarbamate to use the said compounds in such amounts that there is one N-halo carbamate group present for each ene group, it being understood that the total functionality of the system must be greater than four, and the functionality of the N-halo polycarbamate polyene must each be at least two. For example, if two moles of a triene are used, and a N-halo dicarbamate is used as the curing agent, making the total functionality have a value of five, it is preferable to use three moles of the dicarbamate. If much less than this amount of the N-halo polycarbamate is used, the curing rate will be lower and the product will be weaker in some respects because of the reduced crosslink density. If much more than the stoichiometric amount of said polycarbamate is used, the rate of cure may be higher, if that is desirable; and chain extended polymeric products may form, although excessive amounts can lead to a plasticized crosslinked product. However, it is within the scope of this invention to adjust the relative amounts of polyenes and N-halo polycarbamates to any values above the minimum scope disclosed herein which give desirable properties to the crosslinked modified polyene. It must be emphasized that regardless of the ratio of N-halo polycarbamate to polyene, the total functionality of the system must be greater than four, or a crosslinked network will not result, and the product will be a swellable, chain-extended composition which may in some cases be the desired product.

A typical example of a N-halo polycarbamate crosslinked polymeric product such as that formed from poly unsaturated polymers having multiple vinyl side chains or internal carbon double bonds in the polymer backbone, e.g., polybutadienes, may be schematically illustrated below. No attempt to show structural arrangement of the polymer is to be inferred.

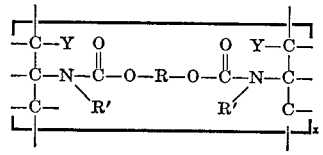

wherein R, R' and Y have been previously defined in above Equation I.

The N halopolycarbamate/polyene mole ratio is selected so as to provide a solid final cured product, i.e., one that is non-flowing and structurally self-supporting under ambient conditions. In typical cases, this ratio can vary from about 0.05 to 4, and preferably from 0.5 to 2.0 moles N-halo carbamate groups per mole ene groups.

In general the mole ratios significantly above or below 1 tend to give a high proportion of chain extension or grafting whereas mole ratios near 1 give predominantly chain extension and crosslinking. Occasionally, however, ratios necessary to give a solid as aforesaid may lie outside the stated range, and experimentation may be necessary to determine a suitable ratio to give a solid. This experimentation is easily carried out, and offers no difficulties to those skilled in the art.

Generally satisfactory modified polymers have been obtained by using amounts of N-halo polycarbamate from 5 to 50 weight percent the polyene.

The compositions to be cured (i.e. converted to solid resins or elastomers) in accord with the present invention may, if desired, include such additives as antioxidants, accelerators, stabilizers, inhibitors, activators, dyes, fillers, pigments, anti-static agents, flame retardants, thickeners, thixotropic agents, surface-active agents, viscosity modifiers, extenders, plasticizers, tackifiers and the like within the scope of this invention. Such additives are usually preblended with the polyene or N-halo polycarbamate prior to or during the compounding step.

Operable fillers include natural and synthetic resins, carbon black, glass fibers, wood flour, clay, silica, alumina, carbonates, oxides, hydroxides, silicates, glass flakes, glass beads, borates, phosphates, diatomaceous earth, talc, kaolin, barium sulfate, calcium sulfate, calcium carbonate, antimony oxide and the like. The aforesaid additives may be present in quantities up to 500 parts or more per 100 parts polymer by weight and preferably 0.005–300 parts on the same basis.

The compounding of the components prior to modification reaction can be carried out in several ways. For example, the polyene, the N-halo polycarbamate and any other inert additives can be admixed in an inert atmosphere and charged to an oxygen-free aerosol can, drum, tube, or cartridge for subsequent use. Generally, mere exposure of said admixed components to the atmosphere under ambient conditions may initiate curing or polymerization reaction.

Another useful method of compounding is to prepare in an ambient atmosphere by conventional mixing techniques, but in the absence of actinic radiation, a composition consisting of polyene, antioxidant (to inhibit spontaneous oxygen-initiated curing), N-halo polycarbamate, UV sensitizer or photoinitiator, and other inert additives. This composition can be stored in the dark for extended periods of time, but on exposure to actinic radiation (e.g., ultraviolet light, sunlight, etc.) will cure controllably and in a very short time period to solid products having $\beta$-halo carbamate linkages.

The following examples are given to further illustrate the present invention. In all cases, unless otherwise noted, all parts and percentages are by weight.

PREPARATION OF THE N-HALO POLYCARBAMATES

Example 1

Phosgenation reaction.—In a 3-liter flask equipped with a condenser, stirrer, thermometer and gas inlet and outlet, 908 g. of phosgene gas was condensed from a cylinder by cooling the flask and condenser to about $-20°$ C. with an acetone/Dry Ice mixture. After 1.5 g. of pyridine was added as a catalyst, 150 g. of ethylene glycol was introduced dropwise with stirring and continued cooling. Thereafter, additional phosgene was added together with more glycol for a total of 310.5 g. of ethylene glycol and 1,900 g. of phosgene. A constant nitrogen flush was used to remove the HCl gas formed.

After the end of the addition, stirring was continued for 2–3 hours and the temperature then allowed to rise gradually to 20° C., followed by warming to 35° C. Stirring was continued for an additional 2 hours. Both the flask and the condenser had been allowed to warm to these temperatures. 3.5 g. of copper chloride were added to complex the pyridine and the product left overnight. On the next day, the solution was filtered to remove the brown copper complex precipitate and the filtrate washed five times with 100 ml. portions of water. The product was then distilled at 10 mm. Hg, boiling between 91–94° C. The yield was 820 g. of ethylene glycol dichloroformate which was used in the preparation of the carbamate below.

Ammonolysis reaction.—1,132.5 g. (19.32 moles) of aqueous 29% ammonium hydroxide was placed into a 4-liter beaker and cooled to 0 to 5° C. in an ice/salt bath. The ethylene glycol dichloroformate 820 g. (4.39 moles) was then introduced dropwise with cooling and stirring. The introduction took about 3 hours, the temperature being maintained below about 10° C. After warming to room temperature to complete the reaction, the product was cooled to 0° C. and filtered. The white precipitate was washed with cold water repeatedly and recrystallized by dissolving in water of 75° C. (3500 mls. total volume). On cooling, the product crystallized in white needles. These were filtered off, and dried in a vacuum oven at about 50° C. 589.2 g. of ethylene glycol dicarbamate, melting poing 166 to 167° C. were obtained.

Chlorination reaction.—In a 3-liter flask equipped with a condenser, stirrer, thermometer and gas inlet and outlet, 74 g. (0.5 mole) of the above formed ethylene glycol dicarbamate were slurried in 1,300 mls. of water. The mixture was cooled in an ice bath to 0° C. Gaseous chlorine (149 g.=2.0 moles) was added at the rate of 2 g./min. through a dip tube, the temperature being maintained between 0 and 4° C. For better control of the total amount of $Cl_2$ added, chlorine had been first condensed in a trap and the weight adjusted. It was then vaporized through a flowmeter into the reaction mixture. After 41 minutes, 86 g. of sodium acetate and 10 g. of acetic acid were added as buffers. Prior to the end of the $Cl_2$ addition, 200 mls. of chloroform were added, resulting in the formation of a yellow solution.

After the end of the $Cl_2$ addition, the mixture was stirred for 15 minutes, the layers allowed to separate and the yellow chloroform layer removed. It was washed with water, dried with anhydrous sodium sulfate, and filtered. 500 mls. of cyclohexane were added and the mixture cooled in an ice-salt bath. Light yellow needles of the product ethylene glycol bis (N,N-dichlorocarbamate) precipitated. These were collected, dried for 2 hours under vacuum at 25° C. This chlorinated product had a melting point of 46 to 47° C. and an iodometric titration of this product gave a 49.6% positive chlorine content (calculated 49.5%).

Samples of the thus formed ethylene glycol bis (N,N-dichlorocarbamate) could be stored in closed jars, wrapped in aluminum foil without any decomposition or material change in positive chlorine content.

Example 2

Phosgenation reaction.—To a 5-liter flask equipped with a condenser, stirrer, thermometer and gas inlet and outlet was charged 135.2 g. (1 mole) of finely ground pentaerythritol and 1,540 mls. of bis(2-ethoxyethyl) ether. Both the flask and the condenser were cooled with acetone/Dry Ice mixture to $-40°$ C. 10 drops of pyridine was added as a catalyst, followed by 908 g. of phosgene, introduced gradually as a liquid. The mixture was slowly allowed to warm to room temperature, while the condenser was being maintained under intensive cooling. A constant nitrogen flush was used to remove the HCl. Within six hours, approximately 90% of the solid pentaerythritol had been solubilized, the remainder dissolved overnight. The nitrogen flush was continued for two hours, resulting in the removal of all of the excess unreacted phosgene. The resulting yellow solution of the pentaerythritol tetrachloroformate in the ethoxy ethyl ether was used as such for preparation of the carbamate below.

Ammonolysis reaction.—In a 6-liter stainless steel beaker, equipped with mechanical stirring, was added 1500 ml. of 28% ammonium hydroxide and cooled below 0° C. by an ice/salt bath. The entire solution of pentaerythritol tetrachloroformate in ethoxy ethyl ether from the above preparation was then gradually introduced with stirring, the temperature being maintained between —5° and 0° C. An additional 1000 mls. of 28% ammonium hydroxide was added gradually, whenever the pH of the solution tended to approach neutral (an excess of ammonia was maintained at all times).

After an additional two hours of stirring, the mixture was filtered and dried under vacuum. One half of the crude product was recrystallized from water at 70 to 80° C. The resulting pentaerythritol tetracarbamate product had a melting point of 268 to 269° C. Elemental analysis of the same showed that the product had 34% carbon, 6.5% hydrogen and 17.2% nitrogen content.

Chlorination reaction.—In an ice-cooled 3-liter flask equipped with a condenser, stirrer, thermometer and gas inlet and outlet, 60 g. (0.1945 mole) of the above formed and finely ground pentaerythritol tetracarbamate was slurried in 1000 mls. of water. 127.4 g. of sodium acetate, (1.556 mole) and 10.9 g. (0.156 mole) of acetic acid were then added as buffer. The mixture was cooled to 0 to 5° C. and a chlorine stream introduced slowly at the rate of 1 g./min. After about 50 g. of the chlorine had been added, 750 mls. of chloroform were introduced. The chlorine introduction was continued until a total of 124 g. (110% of theory) had been added. After the addition of chlorine was completed, the solution was gradually warmed to room temperature and flushed with nitrogen to remove excess chlorine and nitrogen trichloride. An additional 100 mls. of chloroform were used to wash down the precipitate adhering to the walls and stirrer.

The chloroform layer was then separated and washed five times with 50 mls. of water. A small amount of solid material separated and was removed with the water. The chloroform solution was dried overnight with sodium sulfate, then filtered and evaporated under vacuum, thus yielding a yellow waxy solid. After this finished crude product was extracted with isopropyl ether, a powdery yellow product was obtained which was rapidly dried under vacuum. The product pentaerythritol tetra (N,N-dichlorocarbamate) was analyzed iodometrically, giving 44.0 to 46.3% positive chlorine content. This chlorinated product remained stable to storage for several months without change in chlorine content.

Example 3

Following the procedures outlined in Example 2, using the necessary amounts of reactants and replacing the pentaerythritol and the solvent bis (2-ethoxy ethyl) ether respectively with a polyalkylene ether hexol sold under the tradename "NIAX Polyol LS-490" by Union Carbide Co., and the solvent carbon tetrachloride, the hexa (N,N-dichlorocarbamate) of the subject polyalkylene ether hexol was prepared. This product will be referred to as N-chloro polycarbamate C hereinafter.

Example 4

Following the procedures outlined in Example 1, using the necessary amounts of reactants and replacing ethylene glycol with 1-phenyl-1, 3-butanediol, a product, hereinafter referred to as N-chloro polycarbamate D and having following structure was obtained:

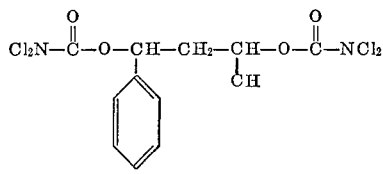

Example 5

Following the procedures outlined in Example 1, using the necessary amounts of reactants, and replacing ethylene glycol with an ethoxylated ethylene diamine, a tetrol sold under the trade name "Quadrol" by Wyandotte Chemical Corporation, a product hereinafter referred to as N-chloro polycarbamate "E" and having the following structure was obtained:

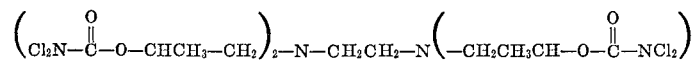

Example 6

Following the procedures outlined in Example 2, using the necessary amounts of reactants, and replacing ethylene glycol with ethoxylated sorbitol 60, a hexol containing 60 ethylene oxide units, commercially available from Atlas Chemical Co., a water soluble hexa (N,N-dichlorocarbamate) of the subject ethoxylated sorbitol 60 was prepared. This product will be referred as N-chloro polycarbamate F.

MODIFICATION REACTION OF POLYENES WITH POLYFUNCTIONAL N-HALO AMINES

Example 7

4 g. of ethylene bis (N,N-dichlorocarbamate), 10 g. of monomeric triallylisocyanurate, and about 0.5% each (based on the weight of the polyene) of phosphorous acid and octadecyl β-(4-hydroxy-3, 5-di-t-butyl) propionate, an anti-oxidant sold under the trade name "Irganox 1076," commercially available from Geigy-Ciba Co. were admixed in a 2-oz. glass dish with rapid stirring at room temperature. The thus formed mixture was transferred to a shallow aluminum cup and irradiated under a 275-watt sunlamp at a surface radiation intensity of 4000 microwatts/cm. This sunlamp was equipped with an infrared radiation absorbing glass filter which was water cooled.

After about 2 hours of UV irradiation, a hard, cured solid, odorless polymer containing β-chloro-N-chlorocarbamate linkages was obtained.

Example 8

10 g. of monomeric pentaerythritol tetrylate were heated to about 60° C. in a 2-oz. glass jar with about 0.05 g. each of phosphorous acid and Irganox 1076, and then cooled; 2.0 g. of ethylene bis (N,N-dichlorocarbamate) was stirred into the reaction mixture and dissolved by heating to about 40° C. The thus formed clear solution was transferred into a shallow aluminum cup. Upon photoexposure of the mixture of a 275-watt sunlamp at a surface radiation intensity of 4000 microwatts/cm.² the sample began to heat up. The reaction vessel was rapidly placed in a dish of ice cold water to prevent excessive exotherm. The mixture, upon photocuring, formed a solid cured product which had a tensile stress of 2200 to 2400 p.s.i., a modulus of $1.8 \times 10^5$ to $2.1 \times 10^5$ p.s.i. and an elongation at failure of 270 to 300%.

Example 9

Example 8 was repeated except that mixture was allowed to stand in the dark under ambient conditions for about 1 hour before being photoexposed. The mixture was then UV irradiated under the IR filtered sunlamp described in Example 7 for about 2 hours. The resultant cured polymer was a hard, crystal clear self-supporting product which remained unchanged after many months of storage.

Example 10

10 g. of triallylisocyanurate, 4 g. of pentaerythritol tetra-(N,N-dichlorocarbamate) and about 0.5 of tri-o-tolyl phosphine (a photosensitizer) were combined in an aluminum cup and allowed to stand overnight in an oven at about 60° C. in order to completely dissolve the chlorocarbamate. The resulting homogeneous liquid mixture was removed from the oven and placed under the IR filtered sunlamp described in Example 7. The mixture gelled after photoexposure for about 1 hour. Thereafter, the mixture was irradiated with a 274-watt sunlamp at a surface radiation intensity of 4000 microwatts/cm.$^2$. After 3 hours of photoexposure a solid, self-supporting cured polymer was formed which had a tensile stress of about 810 p.s.i., a modulus of $1.8 \times 10^5$ p.s.i. and an elongation at failure of about 200%.

Example 11

5.0 g. of monomeric pentaerythritol tetracrylate, 0.5 g. of ethylene bis (N,N-dichlorocarbamate), 0.05 g. of benzophenone (a UV sensitizer) and about 0.025 g. of phosphorous acid were placed in an aluminum cup and stirred together briefly at room temperature and allowed to stand at ambient conditions for about 30 minutes. Thereafter, the mixture was photoexposed to ultraviolet light from a Westinghouse sunlamp giving a skin cure (i.e., curing of the surface) in about 4 minutes. A total exposure of 8 minutes gave a thorough cure which resulted in a tack-free solid product.

Example 12

0.20 g. of liquid polybutadiene commercially available from Sinclair Co. under the trade name "Poly BD R–45 M," 0.10 g. of pentaerythritol tetra (N,N-dichlorocarbamate) and about 1.0% total weight benzophenone were combined in a small glass dish. After briefly heating to about 40° C. to dissolve the reactants, a slight gel formed. After about 5 minutes exposure to ultraviolet light from a Westinghouse sunlamp, a solid gel product formed.

Example 13

2.0 moles of trimethylol propane diallyl ether and 0.2 g. of dibutyl tin dilaurate as a catalyst were charged to a resin kettle maintained under nitrogen and equipped with a stirrer, thermometer, dropping funnel and a gas inlet and outlet. 1.0 mole of tolylene diisocyanate was added slowly with stirring and the reaction temperature was maintained at 70° C. by means of a water bath for the flask. After the addition of the tolylene diisocyanate, the reaction was continued for about 1 hour at 70° C. until the NCO content was substantially zero. The thus formed allyl terminated liquid prepolymer will hereinafter be referred to as Prepolymer A.

Following the procedure outlined in Example 12, a photocurable composition containing 0.60 g. of above formed Prepolymer A, 0.10 g. of pentaerythritol tetra (N,N-dichlorocarbamate) and about 1.0% total weight benzophenone was used. The results were essentially the same as in Example 12.

Example 14

1000 g. of ethoxylated sorbitol 30, a hexol containing 30 ethylene oxide units commercially available from Atlas Chemical Co., was charged to a reaction flask equipped with a condenser, stirrer, thermometer and gas inlet and outlet. The flask was evacuated with a vacuum pump to remove any water present. After evacuation, 5 drops of stannous octoate (catalyst) and 256 ml. (10% excess) of allyl isocyanate was added dropwise by means of an addition funnel while maintaining the temperature at about 80° C. After the addition was completed, the reaction was continued at about 80° C. for about 12 hours. Thereafter the excess allyl isocyanate was removed by means of vacuum. The thus formed allyl terminated polymer will hereinafter be referred to as Prepolymer B.

0.21 g. of the above formed Prepolymer B, 0.10 g. of pentaerythritol tetra (N,N-dichlorocarbamate) and about 0.5% based on the weight of the prepolymer of tri-o-tolyl phosphine were admixed in an aluminum cup and irradiated with ultraviolet light. In less than 5 minutes of photoexposure, a cured solid, self-supporting rubbery polymer resulted.

Example 15

0.07 mole of the triacrylate of the reaction product of trimethylol propane with 20 moles of ethylene oxide ($f=3$) was placed in a 4-oz. glass jar along with 0.005 mole of the N-chloropolycarbamate C ($f=6$) from Example 3 and 1.0% total weight of acetophenone. The reactants were stirred briefly and coated on to a piece of paper by means of a No. 10 rod. The thus coated paper was then placed outdoors in the sunlight under ambient conditions. Within ½ hour a clear cured solid coating resulted on the paper. The same technique was used to successfully coat cotton fabric, plywood, clay coated paper, and a cement block.

Example 16

0.001 mole of a poly (1,3-butadiene) of approximately 2000 molecular weight, 0.003 mole of propylene bis (N-mono-chlorocarbamate) and 0.2% total weight of dibenzosuberone (UV sensitizer) were admixed in a 2-oz. glass jar. The jar containing the reactants was then placed in direct sunlight under ambient conditions. After 12 hours of exposure to direct sunlight, the mixture was converted to a self-supporting, solid clear cured polymeric product.

Example 17

Example 16 was repeated, except that the propylene bis (N-monochlorocarbamate) was replaced by N,N'-dichlorourea (ClNHCONHCl). The results were essentially the same except that the cured polymeric product contained β-chlorourea linkages.

The following examples illustrate the modification reaction promoted by chemical free radical generators. In all the examples, 5 g. of the allyl terminated liquid prepolymer were admixed in a 2-oz. glass jar with a stoichiometric amount of the N-chloropolycarbamate F of Example 6 sufficient to react with all the allyl groups on the prepolymer. In adition, the peroxide along with the accelerator was added. After brief mixing, the reactants were left to cure indoors at ambient conditions. The results are shown in Table I.

TABLE I

| Example Number | Polyene prepolymer | Peroxide (grams) | Accelerator (grams) | Result |
| --- | --- | --- | --- | --- |
| 18 | A | 0.15 g. of 60% methyl ethyl ketone hydroperoxide | 0.05 g. cobalt napthenate | Cured to a solid within 1½ hours. |
| 19 | A | 0.1 g. benzoyl peroxide | 0.2 g. dimethyl aniline | Cured to a solid within 2 minutes |

Example 20

An admixed curable composition containing 1 mole of polytetramethylene ether glycol dimethacrylate having a molecular weight of about 1175 and 0.5 mole of N-chloro polycarbamate E of Example 5 was applied uniformly in a layer thickness of 1 mil on a 10-mil thick steel sheet. The thus coated steel sheet was placed inside a vacuum chamber of a 2 kv. D.C. powered glow discharge apparatus at a distance 2 inches from the glow discharge electrodes. The chamber was evacuated to 0.1 Hg mm.

pressure and thereafter helium gas was introduced into the chamber until a pressure of about 1 mm. Hg was obtained. The glow discharge was then generated inside said chamber for 1 second. A cured self-supporting film resulted from this treatment.

Example 21

Example 20 was repeated except that a corona discharge apparatus was used in place of the glow discharge apparatus. The sample was treated under ambient conditions under a Lepel Treater corona discharge apparatus manufactured by Lepel Corporation, using an air gap of about ¼ inch. The results were essentially the same.

Example 22

The admixed curable composition of Example 8 was applied in a layer thickness of 1 mil to a 4-mil thick commercially available polyethylene terephthalate film. The curable composition was passed under the beam of a 300 kev. Insulated Core Transformer manufactured by High Voltage Engineering at a pass rate of 18.4 inches per minute. The transformer was maintained at a beam current of 95 microamperes while the composition was passed under its 12 inch scan window at a distance of 2 inches therefrom. A cured self-supporting film resulted from this procedure.

The molecular weight of the polyenes, N-halo-polycarbamates, as well as the resulting modified polyenes, i.e. chain extended polymers of the instant invention can be measured by various conventional methods including solution viscosity, osmotic pressure and gel permeation chromatography. Additionally, the molecular weight can be calculated from the known molecular weight of the reactants.

The curable polymer compositions of the instant invention prior to curing can readily be pumped, poured, siphoned, brushed, sprayed, doctored or otherwise handled as desired. Following such application, curing in place to a solid resin or elastomer can be made to occur either very rapidly or extremely slowly as desired by manipulation of the compounding ingredients and the method of curing.

The polyene and N-halo polycarbamate components and compositions of the instant invention can, prior to curing, be admixed with or blended with other monomeric and polymeric materials such as thermoplastic resins, elastomers or thermosetting resin monomeric or polymeric compositions. The resulting blend can then be subjected to conditions for curing or co-curing of the various components of the blend to give cured products having unusual physical properties.

The subject modified polymers, i.e. crosslinked solid cured polymeric products as well as solvent soluble chain extended polymers have many and varied uses. Examples of some uses include, but are not limited to, coatings; films; adhesives; elastomeric sealants; molded articles; wet strength resins, flame retardants, disinfectanes, impregnants for textile materials or other porous surfaces, particularly negative surfaces such as paper, cellulosic materials, silica, clays and the like.

It is understood that the foregoing detailed description is given merely by way of illustration and that many variations may be made therein without departing from the spirit of this invention.

What is claimed is:

1. A composition capable of forming a modified polymer containing β-halo amine linkages in the presence of free radical generating conditions consisting essentially of:
   (1) a polyene having at least two reactive unsaturated carbon to carbon bonds per molecule;
   (2) a polyfunctional N-halo amine of the general formula:

$$R^2—(NR'_{2-n}Y_n)_m$$

wherein $m$ is at least 2; $n$ is 1 or 2; R' is hydrogen or a monovalent hydrocarbyl radical; $R^2$ is a polyvalent organic radical member free from reactive carbon to carbon unsaturation; Y is a halogen selected from the group consisting of chlorine, bromine, fluorine and iodine; the total combined functionality of (a) the reactive unsaturated carbon to carbon bonds per molecule in the polyene and (b) the N-halo amine groups per molecule in the polyfunctional N-halo amine being at least 4, with the N-halo amine/ene mole ratio being selected so as to give a modified polymer product having at least three β-halo amine linkages.

2. The composition of claim 1 wherein the polyfunctional N-halo amine is an N-halo polycarbamate having a molecular weight in the range of 129 to 30,000 of the general formula

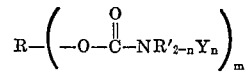

wherein R is a polyvalent organic radical member free from reactive carbon to carbon unsaturation; R' is hydrogen; Y is a halogen selected from the group consisting of chlorine, bromine, fluorine, and iodine; $n$ is an integer from 1 to 2; and $m$ is at least 2.

3. The composition of claim 1 wherein the halogen is chlorine.

4. The composition of claim 1 wherein said total combined functionality is greater than 4 and the modified polymer is a cross-linked, solid, self-supporting cured product.

5. The composition of claim 1 wherein the mole ratio of N-halo amine to ene is from about 0.05/1 to about 4/1.

6. The composition of claim 1 wherein the mole ratio of the N-halo amine to ene is from about 0.5/1 to about 2/1.

7. The composition of claim 1 wherein the modified polymer is a solvent soluble chain extended polymer product.

8. The composition of claim 1 wherein the reactive unsaturated carbon to carbon bonds are conjugated with adjacent unsaturated groupings.

9. A composition of claim 8 wherein the polyene is an ester of an ethylenically unsaturated acid and an aliphatic polyhydric alcohol.

10. A composition of claim 9 wherein said unsaturated acid is acrylic acid and said polyhydric alcohol is pentaerythritol.

11. A composition of claim 1 wherein the polyene is a polyunsaturated polymer having the reactive unsaturated carbon to carbon bonds primarily within the main chain of the molecule, said polymer being selected from the group consisting of unsaturated hydrocarbon polymers, polyesters, polyamides and polyurethanes.

12. A composition of claim 11 wherein said unsaturated hydrocarbon polymer is selected from a group consisting of polybutadiene, polyisoprene, styrene-butadiene copolymers, and styrene-butadiene-acrylonitrile copolymers.

13. A composition of claim 1 wherein the polyene is a terminally unsaturated polyene having a molecular weight in the range of 64 to 20,000 of the general formula:

wherein $y$ is an integer of at least 2; X is a member of the group consisting of

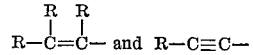

where R is independently selected from the group consisting of hydrogen, halogen, furyl, thienyl, pyridyl, aryl, substituted aryl, cycloalkyl, substituted cycloalkyl, aralkyl, substituted aralkyl and alkyl and substituted alkyl groups containing 1 to 16 carbon atoms and A is free of (1) reactive carbon to carbon unsaturation, and (2) unsaturated groups in conjugation with the reactive ene or yne groups in X and is a polyvalent chemically compatible member of the group consisting of aryl, substituted aryl, aralkyl, substituted aralkyl, cycloalkyl, substituted cycloalkyl and alkyl and substituted alkyl groups containing 1 to 36 carbon atoms, oxide, carboxylate, carbonate, carbonyl, urethane and substituted urethane, urea and substituted urea, amide and substituted amide, amine and substituted amine, sulfide, sulfone, phosphonate, phosphite, phosphate, silane, substituted silane, heterocyclic carbon containing radical and mixtures thereof.

14. A composition of claim 2 wherein $m$ is an integer from 2 to 20.

15. A composition of claim 2 wherein R is polyvalent chemically compatible member of the group consisting of aryl, substituted aryl, aralkyl, substituted aralkyl, cycloalkyl, substituted cycloalkyl and alkyl and substituted alkyl groups containing 1 to 36 carbon atoms, oxide, carboxylate, carbonate, urethane and substituted urethane, urea and substituted urea, amide and substituted amide, amine and substituted amine, sulfide, sulfone, silane, substituted silane radical and mixtures thereof.

16. A process for modifying a polyene which comprises reacting under free radical generating conditions, a polyene having at least 2 reactive unsaturated carbon to carbon bonds per molecule; with a polyfunctional N-halo amine of the general formula:

$$R^2-(NR'_{2-n}Y_n)_m$$

wherein $m$ is at least 2; $n$ is 1 or 2; R' is hydrogen or a monovalent hydrocarbyl radical; $R^2$ is a polyvalent organic radical member free from reactive carbon to carbon unsaturation; Y is a halogen selected from the group consisting of chlorine, bromine, fluorine and iodine; the total combined functionality of (a) the reactive unsaturated carbon to carbon bonds per molecule in the polyene and (b) the N-halo amine groups per molecule in the polyfunctional N-halo amine being at least 4, with the N-halo amine/ene mole ratio being selected so as to give a modified polymer product having at least three β-halo amine linkages.

17. The process of claim 16 wherein the polyene is modified by crosslinking the polyene component.

18. The process of claim 16 wherein the polyfunctional N-halo amine is an N-halo polycarbamate having the general formula:

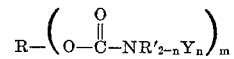

wherein R is a polyvalent organic radical member free from reactive carbon to carbon unsaturation; R' is hydrogen; Y is a halogen selected from the group consisting of chlorine, bromine, fluorine and iodine; $n$ is an integer from 1 to 2; and $m$ is at least 2.

19. The process of claim 16 wherein the halogen is chlorine.

20. The process of claim 16 wherein the free radical conditions are generated by actinic radiation.

21. The process of claim 16 wherein the free radical conditions are generated by chemical free radical generators.

22. The process of claim 16 wherein the free radical conditions are generated by ionizing radiation.

23. A solid product prepared by the process of claim 16.

24. A shaped, molded article cast from the composition of claim 1.

25. An article comprising the composition of claim 1 as a coating on a substrate.

26. An article comprising the composition of claim 1 as an elastomeric sealant.

References Cited

Neal, J. Am. Chem. Soc. 86 (23), pp. 5340–5342, 1964.

Foglia et al., J. Org. Chem. 31, pp. 3625–3631, November 1966.

Neal et al., J. Org. Chem. 34, pp. 1808–1811, June 1969.

DONALD E. CZAJA, Primary Examiner

M. J. WELSH, Assistant Examiner

U.S. Cl. X.R.

204—159.11, 159.16, 159.17, 159.19, 159.2; 260—2 H, 2 R, 37 N, 45.95, 75 UA, 75 T, 75 N, 78 UA, 785 C, 80.7, 85.1, 94.7 N, 482 B; 252—182

UNITED STATES PATENT OFFICE
CERTIFICATE OF CORRECTION

Patent No. 3,730,951          Dated May 1, 1973

Inventor(s) George L. Braude

It is certified that error appears in the above-identified patent and that said Letters Patent are hereby corrected as shown below:

Claim 13, line 63, the formula " $-(X)_y$ "

should read -- $[A]-(X)_y$ --.

Signed and sealed this 18th day of December 1973.

(SEAL)
Attest:

EDWARD M. FLETCHER, JR.
Attesting Officer

RENE D. TEGTMEYER
Acting Commissioner of Patents